(12) United States Patent
Zhang

(10) Patent No.: US 10,254,790 B2
(45) Date of Patent: Apr. 9, 2019

(54) TABLET COMPUTER HAVING A DISPLAY SCREEN AND AN AUXILIARY TOUCH SCREEN

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Shancai Zhang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 74 days.

(21) Appl. No.: 14/803,379

(22) Filed: Jul. 20, 2015

(65) Prior Publication Data
US 2016/0179287 A1  Jun. 23, 2016

(30) Foreign Application Priority Data
Dec. 22, 2014 (CN) .......................... 2014 1 0804154

(51) Int. Cl.
*G06F 3/041* (2006.01)
*G06F 1/16* (2006.01)

(52) U.S. Cl.
CPC .......... *G06F 1/1626* (2013.01); *G06F 1/1647* (2013.01)

(58) Field of Classification Search
CPC ........ G06F 3/041–3/047; G06F 1/1601; G06F 1/1616–1/1622; G06F 1/1626;
(Continued)

(56) References Cited

U.S. PATENT DOCUMENTS

2006/0197750 A1* 9/2006 Kerr .................. G06F 1/1626
                                                          345/173
2008/0090618 A1* 4/2008 Lim .................. G06F 1/1626
                                                          455/566
(Continued)

FOREIGN PATENT DOCUMENTS

CN    202331405 U    7/2012
CN    102662432 A    9/2012
(Continued)

OTHER PUBLICATIONS

First Office Action dated Mar. 20, 2017 in corresponding Chinese Application No. 201410804154.6.

*Primary Examiner* — Lisa S Landis
(74) *Attorney, Agent, or Firm* — Nath, Goldberg & Meyer; Joshua B. Goldberg

(57) ABSTRACT

The present invention relates to a tablet computer including a front surface and a back surface arranged opposite to each other. A display screen is disposed on the front surface, and at least one auxiliary touch screen is disposed on the back surface. When performing a touch operation through the auxiliary touch screen, hands performing the touch operation can still hold the tablet computer. Therefore, the tablet computer can be hold firmly, the hands and arms can hardly fatigue. Meanwhile, the display screen will not be covered when performing touch operation through the auxiliary touch screen. The probability of mistake touch and mistake operation are reduced. Furthermore, when the touch display screen cannot identify a touch action, the user can perform touch operation through the auxiliary touch screen. Therefore, the case in which the tablet computer cannot be used due to identify failure of the touch display screen is avoided.

17 Claims, 4 Drawing Sheets

(58) Field of Classification Search
CPC .... G06F 1/1637; G06F 1/1643; G06F 1/1647; G06F 1/1692
See application file for complete search history.

(56) References Cited

U.S. PATENT DOCUMENTS

| | | | | |
|---|---|---|---|---|
| 2013/0063385 A1* | 3/2013 | Nishio | ............... | G06F 1/1626 345/173 |
| 2013/0155070 A1* | 6/2013 | Luo | ............... | G06T 11/20 345/441 |
| 2013/0342480 A1 | 12/2013 | Moon et al. | | |
| 2014/0078091 A1* | 3/2014 | Lu | ............... | G06F 1/1692 345/173 |
| 2015/0254624 A1* | 9/2015 | Matsumoto | ............... | G07G 1/01 345/659 |
| 2016/0063947 A1* | 3/2016 | Lin | ............... | B60K 37/02 345/520 |

FOREIGN PATENT DOCUMENTS

| | | |
|---|---|---|
| CN | 203930577 U | 11/2014 |
| KR | 10-1341737 B1 | 12/2013 |

\* cited by examiner

TABLET COMPUTER HAVING A DISPLAY SCREEN AND AN AUXILIARY TOUCH SCREEN

CROSS REFERENCE OF RELATED APPLICATION

The present application claims the priority of Chinese Application No. 201410804154.6, filed to State Intellectual Property Office of P.R. China on Dec. 22, 2014, the entire contents of which are herein incorporated by reference.

FIELD OF THE INVENTION

The present invention relates to the field of intelligent terminal device technology, and in particular relates to a tablet computer.

BACKGROUND OF THE INVENTION

With the rapid development of intelligent terminal device, tablet computers are rapidly popular, and have entered into the people's daily life, and bring an experience different from that brought by mobile phones, conventional PCs and laptops. A Tablet computer generally includes a display screen and a touch screen. The display screen is configured to display a picture, and the touch screen is configured to perform touch operation.

Currently, the size of the screen of the tablet computer is about 7-10 inch. In the future, there may be tablet computers with larger size. Compared with of a mobile phone, the size of the screen of the tablet computer is larger. Accordingly, the weight of the tablet computer is heavier. The bigger size and heavier weight make it difficult for a user to operate the tablet computer in a same manner as operating a mobile phone, that is, the user can hardly hold and perform touch operation on the tablet computer with only one hand at the same time. Generally, when the user uses the tablet computer, the tablet computer needs to be put on a table or a bracket, or held with both hands (when no touch operation needs to be performed), or in the case of holding the tablet computer with a single hand, touch operation is performed with another hand.

Currently, the following problems exist in using the tablet computer:

Firstly, when a tablet computer is used in some circumstances (such as outdoors, or walking), and a touch operation is required, a user can only hold the tablet computer with a single hand, and the touch operation is performed with another hand. In this case, the hands and arms holding the tablet computer fatigues easily because the weight of the tablet computer is larger and the distance between the barycenter of the tablet computer and the position being hold by the hand is relatively larger. Accordingly, in the case of long time use, it is difficult to hold firmly, and thus the tablet computer is likely to fall off.

Secondly, when the user performs a touch operation, the arms of the user may cover the screen of the tablet computer. In the covered area, the touch screen may be touched by mistake, thus resulting in mistake operation.

In addition, since the corresponding operation on the tablet computer cannot be performed when the touch screen thereof is damaged, even though the display screen works normally, the tablet computer cannot be used.

SUMMARY OF THE INVENTION

The object of the present invention is to overcome one of the above problems existing in the prior art, and provides a tablet computer. A user can perform touch operation when holding the tablet computer with both hands.

In order to achieve the above object, the present invention provides a tablet computer. The tablet computer includes a front surface and a back surface arranged opposite to each other, wherein, a display screen is disposed on the front surface, and at least one auxiliary touch screen is disposed on the back surface.

In an example, a length-width ratio of the auxiliary touch screen is consistent with that of the display screen.

In an example, the display screen is a touch display screen.

In an example, the table computer further includes a touch control chip, and both the touch display screen and the auxiliary touch screen are controlled by the touch screen chip to identify a touch position and an action.

In an example, the number of the auxiliary touch screens is multiple, and at least two opposite sides on the back surface of the tablet computer are provided with the auxiliary touch screens.

In an example, the auxiliary touch screens are disposed on each side on the back surface of the tablet computer.

In an example, the tablet computer includes a control switch, and the control switch is used to control on-off of each auxiliary touch screen.

In an example, the control switch is disposed on a side surface of the tablet computer, and the side surface is connected between the front surface and the back surface.

In an example, at most two auxiliary touch screens are in a on state simultaneously under the control of the control switch; wherein, when the two auxiliary touch screens are in the on state simultaneously under the control of the control switch, the two touch screens controlled by the control switch to be in the on state simultaneously is the auxiliary touch screens located on the two opposite sides of the back surface of the table computer.

In an example, a recess is disposed in the back surface of the table computer, and the auxiliary touch screen is disposed in the recess.

In an example, the number of the at least one auxiliary touch screens is multiple, and at least two adjacent sides on the back surface of the tablet computer are provided with the auxiliary touch screens thereon.

The present invention achieves the following advantages:

An auxiliary touch screen is disposed on the back surface of the table computer provided by the present invention. When the user performs touch operation on the auxiliary touch screen, the hand of the user performing the touch operation can still hold the table computer. Thus, the user can hold the table computer with both hands while performing touch operation. Compared with the prior art, the table computer can be hold more firmly, thus the hands and arms can hardly fatigue, and the table computer can hardly fall off. Meanwhile, when the user performs touch operation on the auxiliary touch screen, the screen of the table computer will not be covered. Compared with the prior art, the probability of mistake touch is reduced, and the mistake operation is thus reduced. Additionally, when the touch display screen on the front surface of the table computer cannot identify a touch action, user can perform touch operation through the auxiliary touch screen, which can avoid the case in which the table computer cannot be used because the touch display screen located on the front surface cannot identify a touch action existing in the prior art.

BRIEF DESCRIPTION OF THE DRAWINGS

The accompanying draws, as a part of the description, are intended to provide further understanding of the present invention, and are used for illustrating the present invention together with the following embodiments, but not to limit the present. In the drawings.

Figure 1:
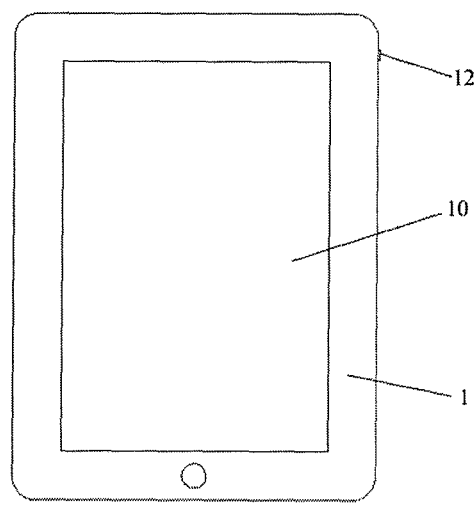
FIG. 1 is a schematic diagram of a front surface of a tablet computer provided by the present invention.

Reference numerals are as follows:

1. tablet computer; 10. display screen; 11. auxiliary touch screen; 12: control switch.

DETAILED DESCRIPTION OF THE EMBODIMENTS

The detailed description of the specific embodiments of the present invention will be given below in combination with the accompanying drawings. It should be understood that the embodiments described herein are only for illustrating and explaining the present invention, rather than limiting the present invention.

Figure 2:
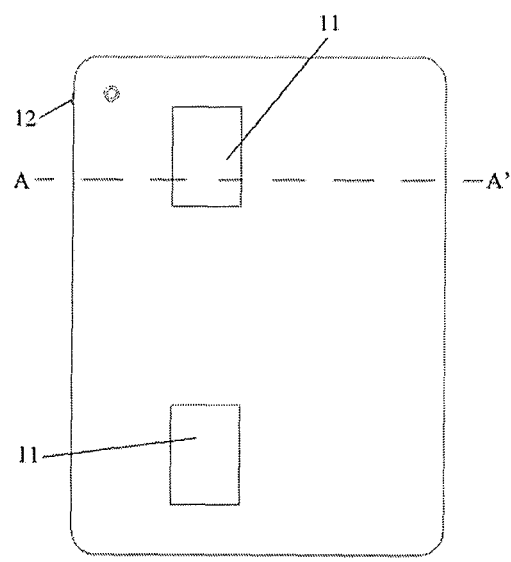
FIG. 2 is a schematic diagram of a back surface of the tablet computer shown in FIG. 1.
Figure 3:
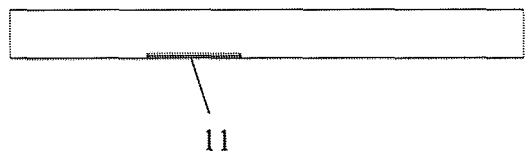
FIG. 3 is a cross-sectional view taken along line A-A' of the tablet computer shown in FIG. 1.

Referring to FIGS. 1 to 3: FIG. 1 is a schematic view of a front surface of a tablet computer provided by the present invention; FIG. 2 is a schematic view of a back surface of the tablet computer shown in FIG. 1; FIG. 3 is a cross-sectional view taken along line A-A' of the tablet computer shown in FIG. 1. In the present embodiment, the tablet computer 1 includes a front surface and a back surface arranged opposite to each other. As shown in the schematic diagram of a front surface as shown in FIG. 1, a display screen 10 is disposed on the front surface of the table computer 1; as shown in the schematic diagram of a back surface as shown in FIG. 2, at least one auxiliary touch screens 11 are disposed on the back surface of the table computer 1. The display screen 10 is used to display a picture. Preferably, the display screen 10 is a touch display screen, in order that the user can perform touch operation through this touch display screen. Meanwhile, the user can also perform touch operation only through the auxiliary touch screen 11.

In the present embodiment, the user can perform touch operation through the auxiliary touch screen 11 disposed on the back surface of the table computer. In this case, the hands performing touch operation by the user can still hold the tablet computer 1. Accordingly, when performing a touch operation, user can still hold the tablet computer 1 with both hands. Compared with the means that a single hand is used to hold the tablet computer and another hand performs touch operation in the prior art, the tablet computer can be hold more firmly according to the present invention, thus the hands and arms of the user can hardly fatigue, and the tablet computer can hardly fall off.

Meanwhile, the display screen 10 will not be covered when the user performs touch operation through the auxiliary touch screen 11. Therefore, compared with the prior art, the probability of mistake touch is reduced, and the mistake operation is thus reduced.

Additionally, since the tablet computer 1 includes a touch display screen and an auxiliary touch screen 11, and the touch display screen and the auxiliary touch screen 11 are disposed on the front surface and back surface of the tablet computer 1, respectively, in the present embodiment, when the touch display screen cannot identify a touch action, the user can perform touch operation through the auxiliary touch screen 11, thus the case in which the tablet computer 1 cannot be used because the touch display screen located on the front surface cannot identify a touch action in the prior art is avoided.

The tablet computer 1 includes a control switch 12. The control switch 12 is used to control the on-off of the auxiliary touch screen 11. As such, the auxiliary touch screen 11 can be switched on through the control switch 12 when the auxiliary touch screen 11 needs to be used, and can be switched off through the control switch 12 when the auxiliary touch screen 11 does not need to be used. Thus, the mistake operation due to mistake touch on the auxiliary touch screen 11 can be avoided, when the auxiliary touch screen 11 does not need to be used. Preferably, the control switch 12 is disposed on a side surface of the tablet computer 1.

In the present embodiment, the length-width ratio of the auxiliary touch screen 11 is consistent with that of the display screen 10. That is, the ratios of the length and width of the auxiliary touch screen 10 to the length and width of the display screen 10 are equal. As such, the respective areas of the auxiliary touch screen 11 correspond to those of the display screen 10. Thus, it facilitates the operation to the corresponding area of the display screen 10 based on the touch operation to a certain area of the auxiliary touch screen 11.

Preferably, the tablet computer 1 also includes a touch control chip (not shown). Both the touch display screen and the auxiliary touch screen 11 identify the position and the action of a touch under the control of the touch control chip. That is, the touch display screen and the auxiliary touch screen 11 share the touch control chip. Compared to the prior art, no additional touch control chip is provided in the tablet computer in the present invention, and thus the cost of the tablet computer 1 does not increase significantly.

In the present embodiment, the auxiliary touch screen 11 is disposed on an area near a side edge of the back surface of the tablet computer 1, that is, on the area in which a region held by the user is located, so that the user can hold the tablet computer 1 while performing the touch operation.

Figure 4:
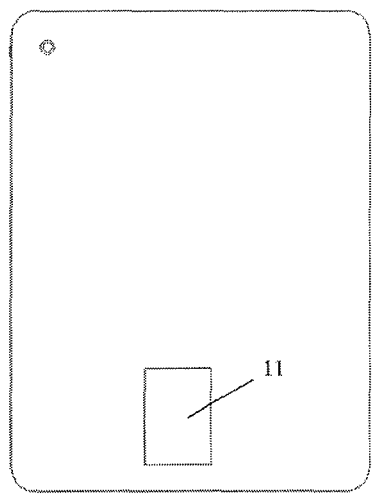
FIG. 4 is a schematic view of a back surface of the tablet computer with the auxiliary touch screen being disposed on the downside thereof.
Figure 5:
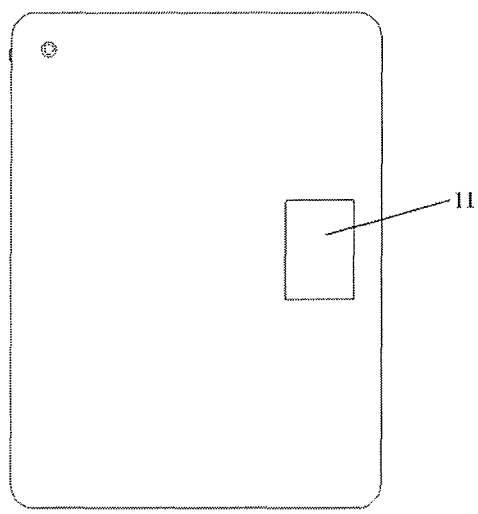
FIG. 5 is a schematic view of a back surface of the tablet computer with the auxiliary touch screen being disposed on the right side thereof.

Specifically, there may be one auxiliary touch screen 11, the auxiliary touch screen 11 may be disposed on the upside or downside of the back surface, as shown in FIG. 4, so that the user can perform touch operation though the auxiliary touch screen 11 while holding the tablet computer 1 widthways. The auxiliary touch screen 11 may be disposed on the left side or right side of the back surface, as shown in FIG. 5, so that the user can perform touch operation though the auxiliary touch screen 11 while holding the tablet computer 1 lengthways.

Figure 6:
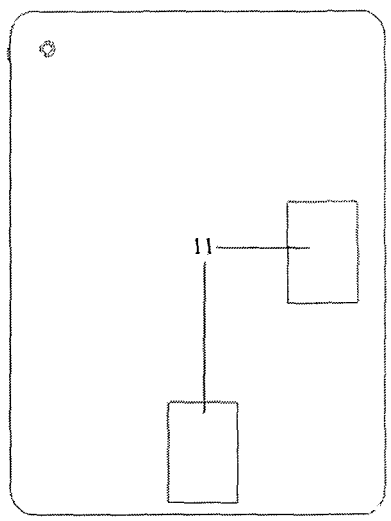
FIG. 6 is a schematic view of a back surface of the tablet computer with the auxiliary touch screen being disposed on two adjacent sides thereof.

In the present embodiment, there may be a plurality of auxiliary touch screens 11. The plurality of auxiliary touch screen 11 may be disposed on the two adjacent side of the back surface of the tablet computer 1, as shown in FIG. 6. In this way, the user can perform touch operation through the auxiliary touch screen 11 while holding the tablet computer 1, no matter whether the user holds the tablet computer 1 widthways or lengthways.

Figure 7:
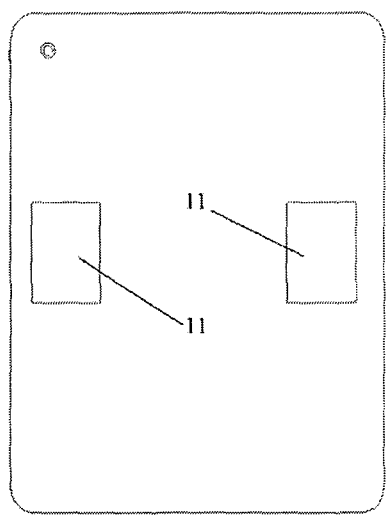
FIG. 7 is a schematic view of a back surface of the tablet computer with the auxiliary touch screen being disposed on two opposite sides thereof.
Figure 8:
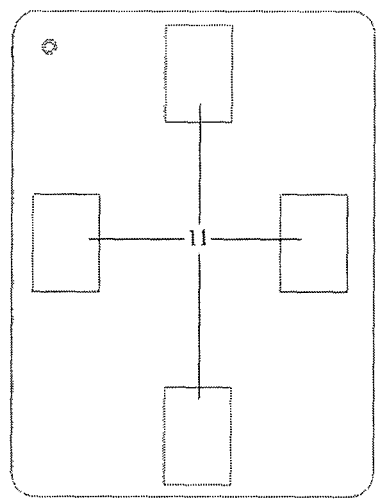
FIG. 8 is a schematic view of a back surface of the tablet computer with the auxiliary touch screen being disposed on any two opposite sides thereof.

In another embodiment of the present invention, the auxiliary touch screens 11 are disposed on at least two opposite sides on the back surface of the tablet computer 1, as shown in FIG. 7. As such, when holding the tablet computer 1 with both hands, the user can perform touch operation by touching the auxiliary touch screen 11 by both hands, or the user can choose his/her preferred hand to perform touch operation according to his/her hand preference, thereby satisfying operating requirements of different users. Preferably, the auxiliary touch screens 11 are disposed on each side of the back surface of the tablet computer 1, as shown in FIG. 8. In this way, while holding any two opposite sides of the tablet computer 1, the user can perform touch operation by touching the auxiliary touch screen 11 by both hands, or the user can choose his/her preferred hand to perform touch operation.

When the number of the auxiliary touch screens 11 is multiple, the control switch 12 is used to control on-off of every auxiliary touch screen 11. With this configuration, the auxiliary touch screen 11 that is chosen by the user to be used is controlled to be in an on state, while the auxiliary touch screen 11 that is not chosen by the user is controlled to be in an off state, such that the mistake operation due to mistake touch of the auxiliary touch screen 11 that is not chosen by the user can be avoided. Preferably, the control switch 12 controls at most two auxiliary touch screens 11 to be in the on state simultaneously, because the user can only touch two auxiliary touch screens 11 by using both hands, and usually holds two opposite sides of the tablet computer 1 when holding the tablet computer 1. When the two auxiliary touch screens 11 are in the on state simultaneously under the control of the control switch, the two auxiliary touch screens 11 which are in the on state under the control of the control switch 12 are the two auxiliary touch screens 11 located on the two opposite sides of the back surface of the tablet computer 1.

In the present embodiment, preferably, a recess is disposed on the back surface of the tablet computer 1, as shown in FIG. 3. The auxiliary touch screen 11 is disposed in the recess. The outer surface of the auxiliary touch screen 11 is flush with or recessed in the back surface of the table computer 1. In this way, when the tablet computer 1 is put on a table or bracket, mistake operation caused by that the auxiliary touch screen 11 contacts with the table or the bracket is avoided.

In summary, the back surface of the tablet computer 1 provided by the present invention is provided with an auxiliary touch screen 11 on the back surface thereof. When a user performs touch operation through the auxiliary touch screen 11, the hands of the user performing the touch operation can still hold the tablet computer 1, and therefore, the user can hold the tablet computer 1 by both hands when performing the touch operation. Compared with the prior art, the tablet computer 1 can be hold more firmly according to the present invention, as a result, the hands and arms of the user can hardly fatigue, and the tablet computer 1 can hardly fall off. Moreover, the display screen 10 of the tablet computer 1 will not be covered when the user is performing touch operation through the auxiliary touch screen 11. Compared with the prior art, the probability of mistake touch can be reduced, and then mistake operation can be reduced.

Furthermore, when the touch display screen on the front surface of the tablet computer 1 cannot identify a touch action, the user can still perform a touch operation through the auxiliary touch screen 11. The case in which the tablet computer 1 cannot be used due to the fact that the touch display screen on the front surface cannot identify a touch action in the prior art can be avoided.

It can be understood that, the above embodiments are merely exemplary embodiments adopted for describing the principle of the present invention, rather than limiting the present invention. Various variations and improvements can be made by those of ordinary skill in the art without departing from the spirit and essence of the present invention, and these variations and improvements are encompassed within the protection scope of the present invention.

The invention claimed is:

1. A tablet computer, including a front surface and a back surface arranged opposite to each other, wherein, a display screen is disposed on the front surface of the tablet computer, and at least three auxiliary touch screens are disposed on the back surface of the tablet computer, each of the auxiliary touch screens being at a corresponding one side of the back surface, wherein each auxiliary touch screen has a size less than that of the display screen and a length-width ratio consistent with that of the display screen, such that respective areas of the auxiliary touch screen are in one-to-one correspondence with respective areas of the display screen, and wherein the tablet computer further comprises a control switch configured to control at most two of the at least three auxiliary touch screens to be in an on state simultaneously.

2. The tablet computer of claim 1, wherein, the display screen is a touch display screen.

3. The tablet computer of claim 2, wherein, the tablet computer further includes a touch control chip, and both the touch display screen and the auxiliary touch screen identify a touch position and a touch action under the control of the touch control chip.

4. The tablet computer of claim 1, wherein, the number of the at least one auxiliary touch screen is multiple, and at least the opposite sides of the back surface of the tablet computer are provided with the auxiliary touch screens thereon.

5. The tablet computer of claim 4, wherein, the auxiliary screens are disposed on each side of the back surface of the tablet computer.

6. The tablet computer of claim 1, wherein, the control switch is configured to control on-off of each auxiliary touch screen.

7. The tablet computer of claim 4, wherein, the control switch is configured to control on-off of each auxiliary touch screen.

8. The tablet computer of claim 5, wherein, the control switch is configured to control on-off of each auxiliary touch screen.

9. The tablet computer of claim 6, wherein, the control switch is disposed on a side surface of the tablet computer, and the side surface is connected between the front surface and back surface.

10. The tablet computer of claim 7, wherein, the control switch is disposed on a side surface of the tablet computer, and the side surface is connected between the front surface and back surface.

11. The tablet computer of claim 8, wherein, the control switch is disposed on a side surface of the tablet computer, and the side surface is connected between the front surface and back surface.

12. The tablet computer of claim 1, wherein, when two auxiliary touch screens are in the on state simultaneously under the control of the control switch, the two touch screens controlled by the control switch to be in the on state simultaneously are the auxiliary touch screens located on two opposite sides of the back surface of the table computer.

13. The tablet computer of claim 7, wherein, when two auxiliary touch screens are in the on state simultaneously under the control of the control switch, the two touch screens controlled by the control switch to be in the on state simultaneously are the auxiliary touch screens located on two opposite sides of the back surface of the table computer.

14. The tablet computer of claim 8, wherein, when two auxiliary touch screens are in the on state simultaneously under the control of the control switch, the two touch screens controlled by the control switch to be in the on state simultaneously are the auxiliary touch screens located on two opposite sides of the back surface of the table computer.

15. The tablet computer of claim 1, wherein, a recess is disposed on the back surface of the tablet computer, and the auxiliary screen is disposed in the recess.

16. The tablet computer of claim 1, wherein at least two adjacent sides of the back surface of the tablet computer are provided with the auxiliary touch screens thereon.

17. The tablet computer of claim 1, wherein, the auxiliary screens are disposed on each side of the back surface of the tablet computer.

* * * * *